United States Patent

[11] 3,554,377

[72] Inventor Omer E. Miller
   2316 Linden Ave., S. Plainfield, N.J. 07060
[21] Appl. No. 760,437
[22] Filed Sept. 18, 1968
[45] Patented Jan. 12, 1971

[54] LIQUID TREATING APPARATUS
   12 Claims, 9 Drawing Figs.
[52] U.S. Cl. .................................................. 210/275,
   210/283, 210/288
[51] Int. Cl. ....................................................... B01d 23/12
[50] Field of Search........................................ 210/266,
   282, 283, 284, 288, 350, 352, 275

[56] References Cited
   UNITED STATES PATENTS

| | | | |
|---|---|---|---|
| 515,769 | 3/1894 | Harris............................ | 210/350X |
| 2,935,928 | 5/1960 | Keating et al.................. | 210/350X |
| 3,174,623 | 3/1965 | Sloan............................. | 210/288X |
| 3,184,064 | 5/1965 | Sampson et al................ | 210/282X |
| 3,254,771 | 6/1966 | Sicard........................... | 210/266 |
| 3,266,628 | 8/1966 | Price............................. | 210/282X |
| 3,319,791 | 5/1967 | Horne............................ | 210/284X |
| 3,342,340 | 9/1967 | Shindell........................ | 210/350X |
| 3,381,823 | 5/1968 | Nash.............................. | 210/288X |
| 89,353 | 4/1869 | Sinclair......................... | 210/283 |
| 1,730,581 | 10/1929 | McMachen et al............. | 210/283 |
| 3,439,809 | 4/1969 | McPherren.................... | 210/282X |

Primary Examiner—Samih N. Zaharna
Attorney—Bacon & Thomas

ABSTRACT: Flexible, free-floating filters are used within a tank structure of liquid treating apparatus. The filters may be of any liquid pervious material but by the use of porous flexible foamed plastic material special advantages are obtained. In a representative embodiment, a vertically disposed tank is provided with a plurality of layers of particulate treating material and the layers are preceded and separated by the flexible filters which slidably engage the tank walls. The pressure of liquid flowing during a normal treatment cycle compacts the layers and the filters and backwash flow in the opposite direction causes the filters to rise and lift the layers thus loosening and agitating the particulate material of the layers. Simultaneously the filters are cleaned. By use of the invention it is possible, for example, to provide within a single compact tank, a complete water treating unit containing replaceable or replenishable layers of treating materials, for the production of high quality water meeting the highest standards for taste, color, odor, pH and mineral content.

PATENTED JAN 12 1971

FILTER CONDITION

BACKWASH CONDITION

INVENTOR.
OMER E. MILLER
BY Bacon & Thomas
ATTORNEYS

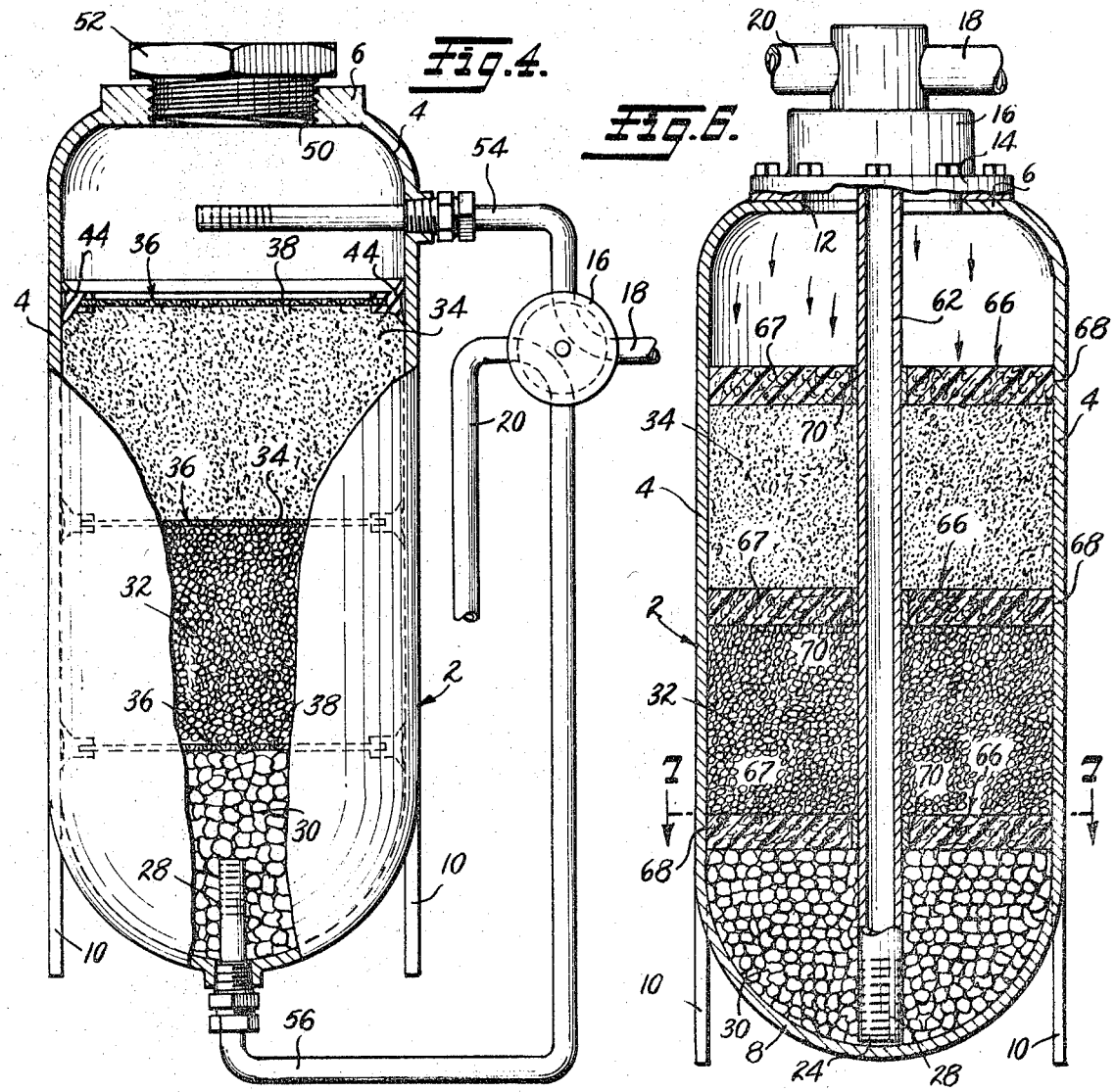

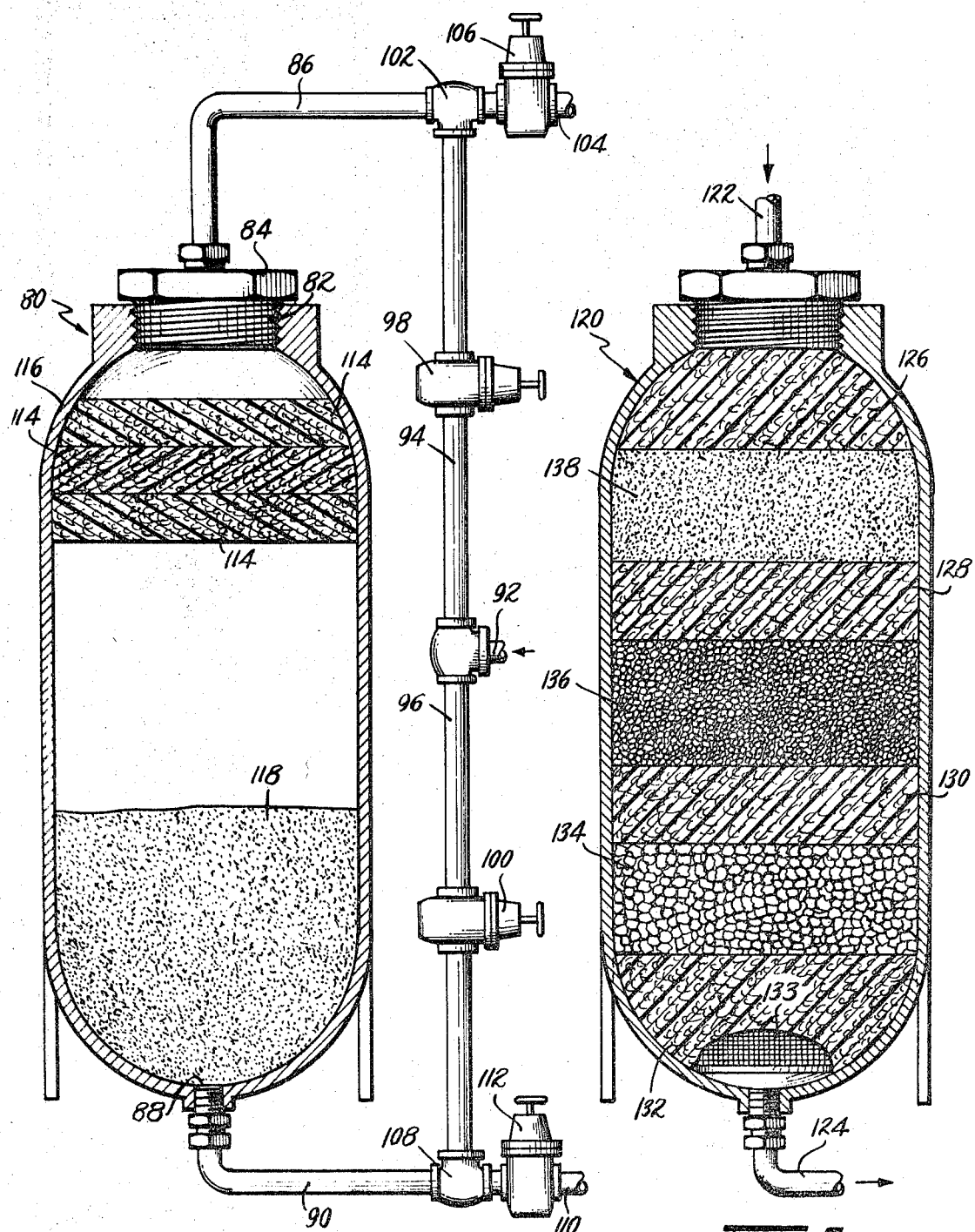

3,554,377

LIQUID TREATING APPARATUS

BACKGROUND OF THE INVENTION

This invention relates to apparatus for treating liquids and particularly where required treatment involves passage of liquid through combinations of successive treating stages such as filtration, acid correction, hardness removal, iron removal, taste, odor, and color correction.

Types of apparatus presently employed use separate tanks employing individual beds and controls. Each tank works independently of the other, requiring its own backwash water, and the installation is complex and costly. Attempts at mixing the various materials used for treatment and inserting them into one tank have failed because programmed treatment cannot be sustained due to stratification within the tank. Also certain of the treating materials dissolve and others must be periodically replaced. Once mixed they cannot be selectively replaced. Separate compartments within a single tank have been proposed. However, each compartment must have its own freeboard for expansion of the material during backwash. Once the compartments are inserted the volume of each compartment is fixed and cannot be adjusted. Further, where more than two compartments are required, difficulties are encountered in filling, replenishing materials, etc. By employing movable filter-diaphragms in a single tank layer configuration according to the present invention, combinations and successive treating stages can be accomplished with one control mechanism and by using the same backwash water for all treating materials. Prefiltration of each layer is accomplished by the filter-diaphragms.

SUMMARY OF THE INVENTION

This invention relates to apparatus for partial or complete treatment of liquids in one vertical upright receptacle. Multiple filtration, acid correction, harness removal, iron removal, manganese removal, pH correction, taste, odor, and color correction can be accomplished by passing liquids through the apparatus.

In general, the invention involves the use of successive layers or beds of granular treating materials which are preceded and separated by slidable or free-floating filter separators or diaphragms interposed between the beds. Various beds are employed depending upon the treatment desired. The filter-separators or diaphragms filter the liquid prior to its entry into a particular layer.

The filter separators or diaphragms are free to slide along the inner walls of the receptacle so that they will permit compaction of the beds in response to the pressure of liquids flowing therethrough. During the treating cycle they are urged along the receptacle in one direction and are urged in the other direction when flow is in the other direction due to back surges or backwash. In both directions of flow the beds or layers are kept separate from each other. The backwash water from the lower beds is used for the intermediate and upper beds in sequence. Water flowing backwards through the filter-separators loosens and purges foreign materials from the separators. Regenerating material, e.g., salt brine for cation exchange beds, may be applied in the backwash flow direction or may be applied in the normal flow direction in a pretreatment step. Its passage through the other beds, e.g. calcite, activated charcoal, greensand, etc. has no adverse effect upon them.

The top filter-diaphragm is generally of finer porosity and does the major portion of filtration. As noted above, foamed plastic material may be used for the filters and when compressed by water pressure during a run cycle become more effective as to filterability. The advantages of foamed plastic material may be realized with simple filtration as well as in combination with other treating materials.

BRIEF DESCRIPTION OF THE DRAWINGS

FIG. 4 is a view similar to FIG. 1, but illustrating a different embodiment of the invention;

FIG. 5 is a fragmentary view similar to FIG. 4 showing a further modification thereof;

FIG. 6 is a longitudinal sectional view, similar to FIG. 1, but showing an embodiment of the invention wherein flexible porous plastic foam filters and separators are used;

FIG. 7 is a transverse sectional view taken along the line 7–7 of FIG. 6; and

FIG. 8 is a schematic sectional view of an embodiment of the invention wherein flexible porous plastic foam is used primarily for filtering purposes;

FIG. 9 is a schematic sectional view of a liquid treating unit wherein layers of treating material are sandwiched between layers of flexible porous foamed plastic.

DESCRIPTION OF REPRESENTATIVE EMBODIMENTS

Figure 1:
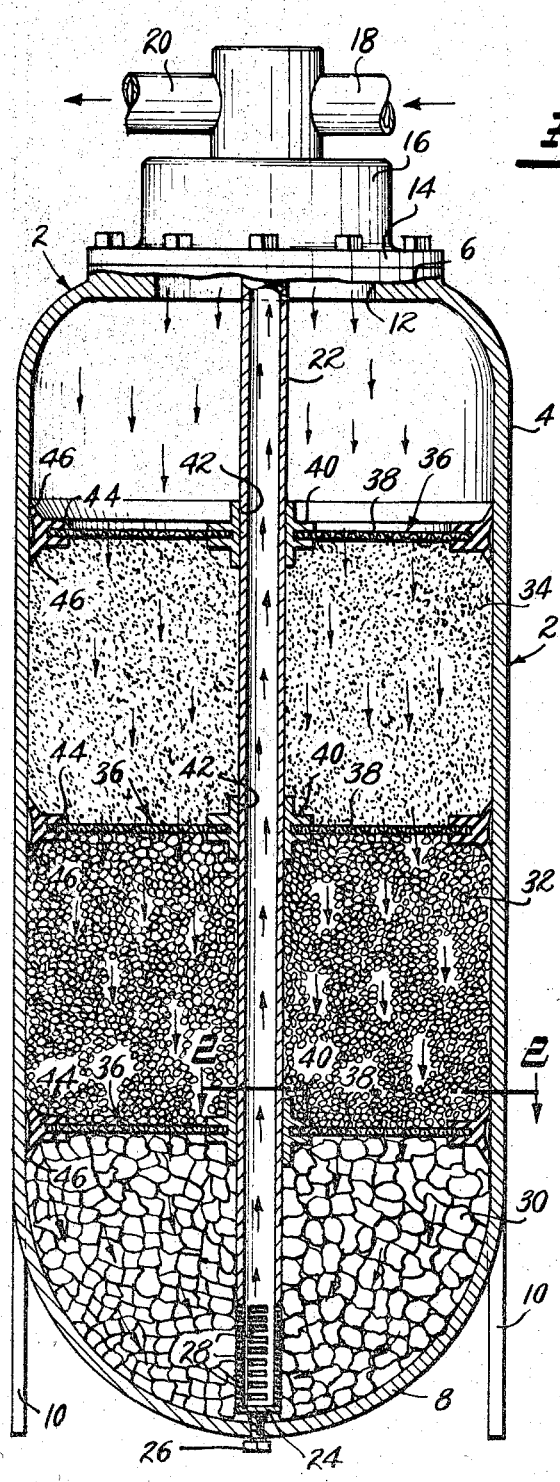
FIG. 1 is a longitudinal sectional view, with parts being shown in elevation, of a complete water conditioning unit embodying the principles of the present invention and illustrating conditions during a water treating cycle.
Figure 3:
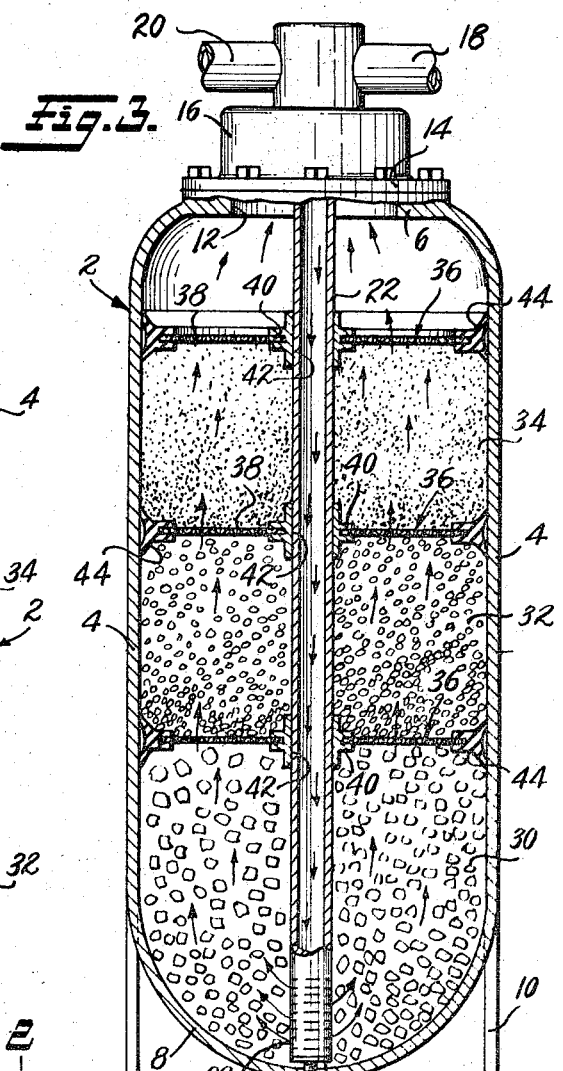
FIG. 3 is a view similar to FIG. 1, on a reduced scale, showing the relative position of the parts during backwash flows.
Figure 2:
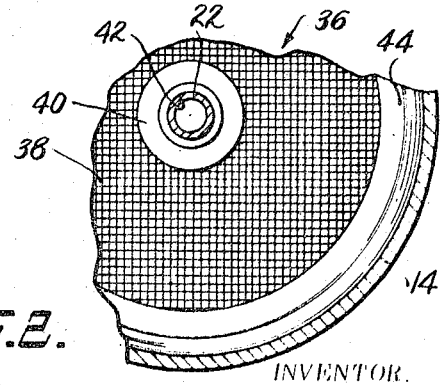
FIG. 2 is a fragmentary transverse sectional view taken along the line 2–2 of FIG. 1.

Referring first to FIGS. 1 to 3, numeral 2 indicates a generally cylindrical receptacle having side walls 4, an upper end wall 6 and a lower end wall 8. While the receptacle is shown and described as being cylindrical, it will be apparent that it can be of any cross-sectional outline provided the walls are all parallel to the longitudinal axis thereof and reference to side walls herein is intended to refer to various portions of a cylindrical wall or to a plurality of planar sidewalls. As shown, the receptacle is provided with legs or feet 10 to hold the same in the upright position illustrated. An access opening 12 is provided in the upper end wall 6 but is normally closed by a closure member 14 comprising a portion of a four-way distributor valve 16 having a liquid inlet conduit 18 and a liquid outlet conduit 20. Extending downwardly from the distributor valve 16 and through the access opening 12 is a tubular conduit 22 extending from the top wall 6 nearly to the bottom wall 8 where it terminates in a lower end 24. A set screw or the like 26 is provided in the bottom end wall 8 to bear against the lower end of the conduit 22 and thereby hold the same against undesired lateral deflections. The lower end of the conduit 22 is provided with a multiplicity of openings 28 therein providing communication between the interior of the conduit and the interior of the receptacle. The openings 28 are provided for the purpose of excluding granular material from the interior of the conduit 22 but in other respects, conduit 22 may be considered as having an open lower end.

The interior of the receptacle 2 is provided with a plurality of beds 30, 32 and 34 of granular or particulate material. In the specific embodiment shown, the granular material is provided for the purpose of conditioning water. In this instance the bed 30 is granular activated carbon for taste and odor control, the bed 32 is of cation exchange resin beads for cation exchange and softening, and the bed 34 is of particulate calcium carbonate, e.g. calcite, for pH increase. For iron removal, one of the beds may be of manganese greensand. Various combinations of sequential beds may be employed. It is to be understood, that the beds may comprise other chemical materials for the purpose of treating other liquids run therethrough, the invention in general, being readily adaptable to any plural bed treating system.

Preceding and between adjacent layers or beds of granular material, there are provided filters, generally designated 36.

Each filter comprises a diaphragm portion 38 which may be in the form of an inert fabric material e.g., woven plastic, or any other suitable material serving to hold the granular material within the respective beds while at the same time providing a filtering function. The topmost filter may be of the finest pore size so that the greatest part of the filtering action takes place before the liquid enters the first treatment bed. In the central portion of each filter diaphragm 38, there is provided a hub or bearing structure 40 affixed to the diaphragm and defining a generally cylindrical bearing 42 slidably embracing the outer surface of conduit 22 whereby the separator filters are freely slidable along the conduit but fit thereabout with sufficient closeness to prevent the passage of granular material therebetween and to restrict flow of liquids therebetween to a large extent.

At its outer periphery each filter diaphragm 38 is provided with an annular ring or rim 44 of rubber or similar elastomeric material secured to the outer periphery of the filter diaphragm and diverging legs or flanges 46 thereof slidably engage the inner surfaces of the sidewalls 4. The diverging flanges 46 serve to prevent passage of granular material past each filter 36 and they function to "wipe" the walls 4 during movement of the filters, which will be described.

As previously stated, 16 is a four-way distributor valve of known and conventional construction, which may be set to direct liquid entering the inlet 18 downwardly into the receptacle through opening 12 outwardly of the conduit 22. Such liquid then passes down through successive filters 36 and beds of granular material to where it can pass through openings 28 to the interior of conduit 22, then flow upwardly therethrough to the outlet 20 of the distributor valve. Flow is in this described direction during operating cycles and it is to be noted that the pressure of the liquid bearing downwardly on the filter diaphragms 38 and successive beds of granular material serve to compact each bed downwardly, the filters 36 being free to slide downwardly to accommodate such compaction. The liquid pressure maintains the beds compacted during the entire treatment cycle. When it is desired to backwash the apparatus for purpose of cleansing or regenerating the granular material, the distributor valve 16 is manipulated to direct liquid entering conduit 18 downwardly through conduit 22, as shown in FIG. 3. The liquid thus passes downwardly through conduit 22, outwardly through openings 28 into the lower bed 30 of granular material, thence upwardly through successive filter 36 and beds 32 and 34 where it flows upwardly through opening 12 to outlet conduit 20. During this backwash flow the pressure on the filters 36 is in an upward direction and causes them to move upwardly from the position shown in FIG. 1 to such positions as indicated in FIG. 3 wherein the beds of material 30, 32 and 34 are no longer held in compacted condition but are quite loose and can be readily agitated and the particles thoroughly contacted by the upwardly flowing liquid. At the same time the filters are cleansed by the up-flowing backwash liquid. As is apparent, the bearings 42 and peripheral rims 44 on each filter permit such longitudinal sliding movement of the filters 36 while maintaining granular material of different beds completely separated and preventing undue flow of liquid either through bearings 42 or between rims 44 and sidewalls 4 of the receptacle. Upon completion of the backwash cycle, the valve 16 is returned to direct the liquids in the manner illustrated in FIG. 1 for a further treatment cycle. Regenerant for the ion-exchange resin bed may be added to the backwash liquid in known manner.

It is to be noted that the access opening 12 is considerably smaller than the normal size of the filters 36 but since the latter are made up of a flexible diaphragm portion 38 and an elastomeric rim 44, the filters may be readily collapsed to a size permitting passage through the opening 12 for installation thereof or for removal from the receptacle.

In the form of the invention shown in FIG. 4 the access opening 50 in top wall 6 is internally threaded and normally closed by a suitable plug 52. In this form the central conduit 22, shown in FIG. 1, is omitted and the filter diaphragms 38 extend completely across the interior of the receptacle without having hubs 40 and bearings 42 mounted thereon. FIG. 4 schematically illustrates a suitable distributor valve 16 and illustrates how it can be rotated to direct incoming liquid from conduit 18 to an inlet conduit 54 extending through the sidewall 4 of the receptacle to discharge its liquid within the receptacle above the granular beds 30, 32 and 34. The incoming liquid then passes downwardly through the initial filter 36 the successive beds and enters openings 28 in a discharge conduit 56 leading to the distributor valve 16 which directs outflow through outlet conduit 20. In operation, this form of the invention is identical with the invention described with reference to FIGS. 1 to 3, as will be obvious but employs apparatus in which the filters 36 do not engage any central conduit. FIG. 4 shows the discharge conduit 56 passing through the bottom wall 8 whereas FIG. 5 illustrates a modification wherein discharge conduit 58 passes through a side of the receptacle into the lower bed 30 of granular material. This form of the invention functions in a manner identical to that already described with reference to FIG. 4.

FIG. 6 illustrates another important embodiment of the invention, similar in tank hardware to the embodiment shown in FIG. 1 and wherein all similar parts are identified by the same reference numerals. However, in this embodiment the filters 66 each comprise a slab of porous flexible foam 67, which, as shown, are in somewhat compressed form due to liquid pressure of a downwardly flowing liquid during a normal run cycle. Suitable foam materials, for example, are the flexible open-cell polyurethane foams, either of the polyether or polyester type, which are readily available commercially. The materials may be obtained in varying densities and pore size which makes it possible to taylor the filter-separators to the particular device and function desired. Different combinations of filters are possible in the same device. For example, the top filter 66 of FIG. 6 may be foam plastic of smaller pore size than the lower filters.

The outer peripheral surfaces 68 of the foam material 67 slidably engages the inner surfaces of the sidewalls 4. The central portion of each slab 67, as shown, is provided with an inset bearing 70, e.g. cemented to the foam portion, slidably embracing the central conduit 60. However, this is optional and can be omitted if desired.

It is to be noted that the slabs 67 of plastic foam material can be resiliently collapsed or compressed so as to be readily insertable or removable through access opening 12, which in this form also is of reduced size. In this embodiment the centering screw 26 shown in FIG. 1 is omitted since the resilient plastic foam filters 66 can readily accommodate to any lateral displacement of the lower end of conduit 60 and the sidewalls do not have to be parallel.

In the form shown in FIG. 8 the container 80 is provided with an opening 82 in which a closure 84 is threaded. A pipe 86 provides a port through the closure 84 to the interior of the container and a further port 88 is provided in the bottom of the container communicating with a pipe 90. This form of the invention is described with reference to a water filter although the device may obviously be used for other than mere filtration purposes. For example, particulate water treating material could be placed in the bottom of the tank. A water inlet pipe 92 branches into pipes 94 and 96 in each of which are valves 98 and 100, respectively. Pipes 86 and 94 are joined at coupling 102 to communicate with pipe 104 in which a valve 106 is placed. In like manner, pipes 90 and 96 meet at coupling 108 joining them to pipe 110 in which a valve 112 is placed. Clearly, the valves 98, 100, 106 and 112 may be relatively open or closed in an obvious manner to direct water entering pipe 92 either into the bottom port 88 of the container and out through pipes 86 and 104, or inwardly through pipe 86 and downwardly through the container to port 88, thence outwardly through pipe 110. In other words, the flow through container 80 may be reversed at will.

In a water filtering cycle it is contemplated that the water enter through port 88 and flow upwardly through the container 80.

Within the container 80 are a plurality of slabs 114 of the flexible plastic foam material already described with reference to FIG. 6. In this form, however, no central conduit is provided and the slabs 114 slidably engage the sidewalls of the container 80 and are freely slidable upwardly and downwardly therein. As shown, the upper portion of the container 90 converges inwardly toward the opening 82, as indicated generally at 116. The foam slabs 114 are preferably of the same relaxed dimensions but when in the upper position shown in FIG. 8, the intermediate slab is slidably compressed in a radial direction and the upper slab is considerably compressed in a radial direction. The foam material comprising the slabs 114 is freely pervious to water and is capable of filtering the water. As the foam material is compressed, the passages therethrough are reduced in size and filtration becomes more efficient, capable of separating smaller particles from the water. Thus, in the arrangement shown, the permeability of the filter slabs 114 decreases in an upward direction. Since the incoming water flows upwardly through the container 80, the pressure and flow of water itself will move the slabs 114 to the upper position and apply sufficient pressure thereto to hold them in the converging portion of the container wherein the slabs are progressively compressed and function to increase the efficiency of filtration. Particles of sand, grit or the like carried into the container with the incoming water tend to settle out of the water in the lower part of the container, as indicated at 118. Smaller particles that do not settle out are separated by the filter slabs 114 so that only substantially clear water exits through passages 86 and 104.

When it is desired to backwash the filter apparatus the direction of flow through the container is reversed and the downward pressure on the slabs 114 causes them to move downwardly into the container 80, to radially expand slightly and rendering backwash and cleansing thereof more thorough and efficient. During the backwash cycle the sand or grit collected at 118 is discharged through the pipes 90 and 110 and the apparatus is then ready for another filtration cycle.

In all forms of the invention employing the flexible plastic foam, it is to be understood that such foams can be obtained in varying degrees of porosity, which is a function of density, some being very coarse and others having only very small passages therethrough. In addition, the material can be compressed in the apparatus as already described to further reduce the size of any or all of the passages therethrough and thus readily increase the efficiency of filtration.

As already indicated the use of the plastic foam materials, which may be in the form of slabs of three inches in thickness, permits their compression and/or distortion into such shape that they may be inserted into the apparatus through a relatively small access opening whereupon they are self-expanding to the position shown in the drawings for the described function. Clearly, the tanks need not have parallel sidewalls since the foam material will readily accommodate to the size and shape of the container as it slides along the upright walls thereof.

In the embodiment shown in FIG. 9, layers of water-treating materials are sandwiched between layers of flexible, porous plastic foam. The tank 120 is similar to the tank 80 shown in FIG. 8. It is provided with an inlet conduit 122 at the top and an outlet conduit 124 at the bottom and it is understood that these conduits may be connected to suitable valves and conduits to provide cycling arrangements for normal run in a down flow direction and backwash or reverse flow of liquids in an upward direction.

Each of the layers 126, 128, 130 and 132 are of slabs of flexible, porous plastic foam. The top layer 126 and the bottom layer 132 as will be noted, conform to the taper in wall sections of the tank although it is not necessary to specially cut the foam to this configuration. These layers act as distributors as well as filters and so prevent channeling from occuring. If desired, a screen or distributor head 133 may be used to prevent the plastic materials from being sucked into the line. Layer 134 may be a layer of granulated activated carbon. Layer 136 may be a layer of cation exchange beads and layer 138 may be granular calcium carbonate for pH control or of manganese greensand for iron removal. The materials are inserted into the tank 120 through the access opening at the top with the foamed plastic material being collapsed or compressed to the extent necessary to clear this opening.

The tank is packed in such manner that it is completely filled and the foam material is at least slightly compressed. It is resiliently urged into engagement with the tank sidewalls so that there can be no mixing or stratification of the liquid treating materials. It will be understood, however, that the resiliency of the plastic foam material is such that movement within the individual beds of treating materials can occur during the operation of the device. For example, all household water softeners and the commercial conditioners are of the intermittent or varied demand type. Thus, a series of successive compressions and expansions of the foam and bed will occur. The upper bed, in particular, will in effect breathe with each demand put on the conditioner. Channeling of the flow of liquid through the bed, however, is virtually eliminated and this is especially true when the beds are short in depth. The beds are always kept in a relatively loose condition by the breathing action and caking is eliminated. On reverse flow, the beds are lifted, expanded and washed, with the flexible plastic foam material being moved and compressed in the opposite direction to allow for this action. In this embodiment, the mass of compressible foam takes the place of the void space at the top of the tank in the previous embodiments shown in FIGS. 1—6. Washing action and bed expansion can be controlled by controlling the pore size and thickness of the filter separators. Thus, liquid pressure on finer pore size filters will be greater than on coarse pore size filters and they will be lifted and compressed to a greater extent during backwash than would the coarse filters. Thick filter layers provide more room for expansion than thin layers. One can adjust to provide substantially optimum conditions for a particular demand.

It will be understood that in all of these multibed systems, the flow rate for backwash will be such as to meet the requirements of the bed requiring the maximum flow rate. Excessive backwash may take place in some of the zones but this is not detrimental since there can be no intermixing of materials between zones and movement of the materials within the zones can be controlled.

While a limited number of specific embodiments have been shown and described, the same are merely illustrative of the principles of the invention whereas the scope of the patent is defined by the appended claims.

I claim:

1. Liquid treating apparatus comprising: a receptacle having upstanding sidewalls extending between receptacle end walls, said receptacle having an access opening provided with removable closure means for introduction of particulate treating materials, liquid inlet means connected to said receptacle and including a port communicating with a top portion of said receptacle, liquid outlet means connected to said receptacle and including a port communicating with a bottom portion of said receptacle, a resiliently collapsible filter of compressible porous foamed plastic material extending between said sidewalls and slidably engageable with said sidewalls throughout their length, a bed of particulate liquid treating material underlying said filter, valve means associated with said inlet and outlet means and constructed and arranged to effect forward and reverse flow of liquid through said filter and bed of liquid treating material, said filter being positioned from the inlet port so as to provide freeboard space in the top of said receptacle and being movable within the receptacle to permit expansion and contraction of said bed in response to conditions of liquid flow and the foamed material of said filter being compressible in response to forward flow of liquid to provide more effective filtering action.

2. Apparatus as defined in claim 1 wherein said receptacle contains separate beds of different particulate treating materials for serial treatment of liquid flowing through said apparatus and a resiliently collapsible filter of compressible porous foamed plastic material is sandwiched between said beds to provide a freely moving separator preventing mixing of the particles of the beds while permitting compaction and expansion of the beds according to liquid flow conditions.

3. Apparatus as defined in claim 1 wherein said receptacle is provided with an access opening in an end wall thereof, said access opening being smaller than the normal size of said filter whereby said filter may be collapsed for passage through said opening.

4. Apparatus as defined in claim 1 comprising a plurality of slabs of said plastic material, and wherein at least one slab of said material engages converging sidewalls of said receptacle for compression therebetween by flow of liquid through said receptacle.

5. Apparatus as defined in claim 1 wherein said liquid outlet means includes a tubular conduit extending from the top end wall of said receptacle toward the other end thereof between and substantially parallel to said sidewalls and through said filter; and bearing means slidably embracing said conduit and being affixed to said filter whereby to guide said filter along said conduit.

6. Apparatus as defined in claim 1 wherein said outlet means includes a conduit extending through the top end wall and terminating in said port communicating with the bottom portion of said receptacle.

7. A liquid treating apparatus comprising a vertical tank, liquid inlet means connected to the tank and including a port in the top portion of the tank for introduction of liquid to be treated, liquid outlet means connected to the tank and including a port at the bottom portion of the tank for withdrawing treated liquid, valve means associated with said liquid inlet and outlet means and constructed and arranged to effect forward and reverse flow of liquid between said inlet and outlet ports, a plurality of serially disposed beds of particulate treating material positioned between said inlet and outlet ports, a flexible filter of compressible foamed plastic material between said inlet port and the topmost bed of particulate material and positioned to provide a freeboard space at the top of the tank, and a flexible filter of compressible foamed plastic material between each bed of particulate material and the next adjacent bed of the series, each said flexible filter slidably engaging the inside walls of the tank to prevent intermingling of the particulate material of the respective beds while permitting compaction and expansion of the beds during normal and reverse flow cycles, respectively, and the foamed material of said filter being compressible in response to forward flow of liquid to provide more effective filtering action.

8. Apparatus as defined in claim 7 wherein at least portions of said sidewalls converge inwardly toward one end of said receptacle whereby to progressively radially compress said foam filter when it slides toward said one end.

9. Apparatus as defined in claim 7 wherein the outlet means comprises a conduit extending axially from the top of the tank through the beds of particulate material to the withdrawal port in the bottom portion of the tank wherein the flexible filters slidably engage said axially extending conduit.

10. The apparatus of claim 7 wherein the beds of particulate material comprise separate beds of calcium carbonate, cation exchange material, and activated carbon for control of acidity, hardness, taste and odor of water.

11. The apparatus of claim 7 wherein the filter between the liquid inlet port and the topmost bed of particulate material is of finer pore size than the remainder of the filters.

12. A liquid treating apparatus comprising a vertical tank having an access opening provided with removal closure means for introduction of particulate treating materials, a liquid inlet means connected to the tank and including a port in the top portion of said tank for introduction of liquid to be treated, liquid outlet means including a tubular conduit extending axially downward within the tank from the top of the tank and having a port at the bottom portion of the tank for withdrawing treated liquid, means for effecting reverse flow of liquid between said inlet and outlet ports, a plurality of serially disposed beds of particulate treating material positioned between said inlet and outlet ports, a flexible filter between said inlet port and the topmost bed of particulate material and a flexible filter between each bed of particulate material and the next bed of the series, each of said flexible filters comprising a sheet of flexible filter material and a peripheral rim thereon of elastomeric material normally assuming a shape complementary to the sectional shape of said tank transverse to the sidewalls of the tank and slidably engaging said sidewalls and each of said filters having an axial opening and bearing means affixed to the filter within said opening, said bearing means slidably embracing said conduit, whereby the flexible filters are slidably movable vertically within the tank guided by the axial conduit while preventing intermingling of the particulate material of the respective beds and while permitting compaction and expansion of the beds during normal and reverse flow cycles, respectively.